3,352,905
OXIDATION OF LOWER ALIPHATIC
ALDEHYDES
Ralph O. Kerr, Houston, Tex., assignor to Petro-Tex Chemical Corporation, Houston, Tex., a corporation of Delaware
No Drawing. Filed Sept. 7, 1965, Ser. No. 485,603
10 Claims. (Cl. 260—530)

This application is a continuation-in-part of my earlier filed copending application Ser. No. 90,226, filed Feb. 20, 1961, now abandoned, entitled "Aliphatic Acids by Oxidation."

This invention relates to a process and a catalyst for the vapor phase oxidation of lower aliphatic aldehydes to the corresponding aliphatic acids. The catalyst and process of this invention are particularly useful in the oxidation of acrolein or methacrolein to acrylic and methacrylic acids, respectively.

Unsaturated acids such as methacrylic acid have been produced by the liquid phase oxidation of unsaturated aldehydes in a solvent. However, this method has the disadvantage of requiring a solvent recovery and the disadvantage of generally requiring expensive oxidizing agents such as peroxides. Acrylic acid has been prepared by the reaction of ethylene oxide with HCN to produce hydroxypripionitrile which is then alcoholized in the presence of sulfuric acid to produce the ester. The ester is then dehydrated with $P_2O_5$. It is desirable to have a process whereby a more direct and less expensive method of preparation of these acids is accomplished.

It is accordingly an object of this invention to provide an improved process for obtaining high yields of unsaturated acids by the vapor phase oxidation of unsaturated aldehydes. It is another object of this invention to provide an improved process for the vapor phase oxidation of monoethylenically unsaturated aldehydes such as acrolein and methacrolein to acrylic and methacrylic acid respectively. It is a further object of this invention to produce a novel and improved catalyst which is useful in obtaining increased yields of product by vapor phase catalytic oxidation of unsaturated aldehydes to the unsaturated acid, and to a method of making the same. Other objects will be apparent from the description thereof which follows.

According to the present invention, a method has been discovered whereby unsaturated aldehydes may be oxidized to acids by contacting said aldehyde in the vapor phase with oxygen as an oxidant and a novel catalyst. In a preferred embodiment of this invention, water vapor is also present during the oxidation reaction. The catalysts for use in this invention contain as their main active constituent a chemical complex of vanadium, phosphorus, oxygen, and a third metal component selected from the group consisting of iron, cobalt, nickel, and mixtures thereof. The atomic ratio of the phosphorus, vanadium and third metal component is present in relative proportions of about 0.15 to 0.50 atom of vanadium to about 0.30 to 0.70 atom of phosphorus to about 0.05 to 0.35 atom of the third metal component. The preferred proportions are from about 0.20 to 0.40 atom of vanadium to 0.40 to 0.65 atom of phosphorus to about 0.10 to 0.30 atom of the third metal component. The atomic ratio of oxygen to the remaining components of the catalyst, when the catalyst is being used to catalyze the oxidation, is difficult to determine and probably is not constant due to the competing reactions of oxidation and reduction taking place during the reaction, particularly at the high temperatures.

A critical operational feature of this invention is that the reactants must be contacted in the presence of a catalytic active composition comprising as its main active constituent a catalytic complex of vanadium, phosphorus, oxygen and a third metal component. Generally, this catalytic complex will be present in the catalytic active composition in a concentration such that for each 100 atoms of actives present, the catalytic complex of vanadium, phosphorus and third metal component will constitute at least 60 atoms, excluding oxygen. In other words, at least 60 percent of the total catalytic actives will be made up of the vanadium, phosphorus and third metal complex, excluding oxygen. A still further preferred embodiment of this invention is that the catalytic complex constitutes at least 80 percent of the total actives present in the catalytic active composition, and still more preferably, constitutes at least 90 percent of the total actives present, excluding oxygen. A catalytic active composition consisting essentially of a catalytic complex of vanadium, phosphorus, oxygen and a third metal component selected from the group consisting essentially of iron, cobalt and nickel in the atomic ratios herein above set forth can be similarly used and excellent results obtained.

A surprising feature of this invention is that the addition of minimum amounts of a third metal component will greatly increase the catalytic effectiveness of a vanadium-phosphorus complex, particularly when such complex is used as a catalyst for oxidizing aldehydes to their respective acids. For example, a vanadium-phosphorus catalytic complex in which the active ingredients are present in a ratio of 1.38 atoms of phosphorus per atom of vanadium, is capable of oxidizing only 9 percent of the methacrolein introduced into the oxidative system to methacrylic acid. However, when approximately 15 percent of a third metal component, such as cobalt, was added to the vanadium-phosphorus complex, methacrylic acid yields increased to 35 and 40 percent under essentially the same oxidation conditions.

The catalyst may be prepared in a number of ways. A preferred method to obtain catalysts which produce high yields of acid upon oxidation of aldehydes is whereby the catalyst complex is formed in solution and deposited as a solution onto a carrier. According to one preferred solution method, the vanadium is present in solution with an average valence of less than plus five in the finely formed complex in solution. Preferably, the vanadium has an average valence of less than plus five at the time the solution of catalyst complex is deposited onto the carrier, if a carrier is used. The reduced vanadium with a valence of less than five may be obtained either by initially using a vanadium compound wherein the vanadium has a valence of less than five, such as vanadyl chloride, or by initially using a vanadium compound with a valence of plus five, such as $V_2O_5$ and thereafter reducing to the lower valence with, for example, hydrochloric acid during the catalyst preparation to form the vanadium oxysalt, vanadyl chloride, in situ. The vanadium compound may be dissolved in a reducing solvent which solvent functions not only to form a solvent for the reaction, but also to reduce the valence of the vanadium compound to a valence of less than five. For example, the vanadium, phosphorus and the third metal component compounds may be dissolved in any order in a suitable reducing solvent and the formation of the complex allowed to take place. Preferably, the vanadium compound is first dissolved in the solvent and thereafter the phosphorus and third metal component compounds are added. The reaction to form the complex may be accelerated by the application of heat. The deep blue color of the solution shows the vanadium has an average valence of less than five. The complex formed is then, without a precipitation step, deposited as a solution onto a carrier and dried. In this preferred procedure, the vanadium has an average valence of less than plus five at the time it is deposited onto the carrier. Generally, the average valence of the vanadium will be between about plus 2.5 and 4.6 at the time of deposition onto the carrier.

When the above described preferred solution method is employed, reducing agents for the vanadium may be either organic or inorganic. Acids such as hydrochloric, hydroiodic, hydrobromic, acetic, oxalic, malic, citric, formic and mixtures thereof, such as a mixture of hydrochloric and oxalic may be used. Sulphur dioxide may be used. Less desirably, sulfuric and hydrofluoric acids may be amployed. Other reducing agents which may be employed, but which have not given as desirable catalysts are organic aldehydes such as formaldehyde and acetaldehyde; alcohols such as pentaerythritol, diacetone alcohol and diethanol amine, and additional reducing agents such as hydroxyl amines, hydrazine, and nitric oxide. Nitric acid and similar oxidizing acids which would oxidize the vanadium from a valence of 4 to 5 during the preparation of the catalyst should be avoided. Generally the reducing agents form oxysalts of vanadium. For example, if $V_2O_5$ is dissolved in hydrochloric or oxalic acid, the corresponding vanadium oxysalts are produced. These vanadium oxysalts should have as the salt forming anion an anion which is more volatile than the phosphate anion.

Another method of preparation of the catalyst complex is to dissolve the third metal component and a vanadium compound such as ammonium metavanadate or vanadium pentoxide in an aqueous solution of phosphoric acid. After the components have been dissolved, the solution is heated until precipitation occurs. The precipitant can then be dried and used as a catalyst or a carrier may be combined with the liquid phase either before or after the precipitation.

The time at which the third metal component is incorporated into the solution is not critical so long as it is in solution before the catalyst complex is coated onto the carrier. The third metal component may be added after the vanadium compound and the phosphorus compound have been reacted or the third metal component may be added either before, at the same time, or after either the vanadium or phosphorus compound has been added.

Any vanadium, phosphorus and third metal component compound may be used as starting materials which when the compounds are combined and heated to dryness in air at a temperature of, for example, 350° C. will leave as a deposit a catalyst complex having relative proportions within the above described ranges. Generally, phosphorus compounds are used which have as the cation an ion which is more volatile than the phosphate anion. Phosphorus compounds which are essentially completely soluble in boiling 37 percent aqueous hydrochloric acid under standard conditions are preferred. Various compounds may be used, such as metaphosphoric acid, triphosphoric acid, pyrophosphoric acid, ortho-phosphoric acid, phosphorus pentoxide, phosphorus oxyiodide, ethyl phosphate, methyl phosphate, amine phosphate, phosphorus pentachloride, phosphorus trichloride, phosphorus oxybromide, and the like.

Suitable vanadium compounds useful as starting materials are compounds such as vanadium pentoxide, ammonium metavanadate, vanadyl chloride, vanadyl dichloride, vanadyl trichloride, vanadium sulfate, vanadium phosphate, vanadium tribromide vanadyl formate, vanadyl oxalate, metavanadic acid, pyrovanadic acid, and the like. Generally, any vanadium compound which has an anion which is either the phosphate anion or is more volatile than the phosphate anion is satisfactory. Vanadium compounds which are essentially completely soluble in boiling 37 percent aqueous hydrochloric acid under standard conditions are preferred.

Suitable third metal component compounds useful as starting materials are various compounds of cobalt, iron and nickel, such as the halides, phosphates, oxides, carbonates, sulfates, nitrates, acetates, formates, and so forth. The metals as such may be used. Generally any cobalt, iron or nickel compound is preferred which either has as the phosphate anion, or an anion which is completely soluble in boiling 37 percent aqueous hydrochloric acid under standard conditions. Compound such as cobaltic chloride, cobaltic hydroxide, cobaltic oxide, cobaltous acetate, cobaltous bromide, cobaltous chloride, cobaltous nitrate, cobaltous oxalate, cobaltous sulfate, ferrous carbonate, ferrous oxide, ferrous chloride, ferric acetate, ferric chloride, ferric hydroxide, ferric oxide, ferric phosphate, nickel carbonate, nickel sesquioxide and the like are useful compounds to be reacted together to form the complex. Mixtures of the various compounds may be used, such as a mixture of two iron compounds or a mixture of a cobalt and a nickel compound.

The catalyst complex containing vanadium, phosphorus and third metal component may be formed by simply causing the combination of each of the ingredient components in a solution or dispersion. Heat may be applied to accelerate the formation of the complex. One method of forming the complex is by causing the ingredients to react under reflux conditions at atmospheric pressure. Under reflux conditions, this reaction generally takes about one to two hours.

Inert diluents such as silica may be present in the catalyst, but the combined weight of the vanadium, oxygen, phosphorus and the third metal component should preferably constitute at least about 50 weight percent of the composition which is coated on the carrier. If any, and preferably these components constitute at least about 75 weight percent of the composition coated on the carrier, and more preferably at least about 95 weight percent. Any remainder other than the vanadium, oxygen, phosphorus and third metal component may be any essentially inert, non-catalytic ingredient intimately combined with the vanadium, oxygen, phosphorus and third metal component as a part of the coating on the carrier.

Although the catalysts may be separately formed and used as pellets, it is more economical and practical to deposit this material on a carrier, such as aluminum oxide or silica. Before the carrier is combined with the catalyst, the solution of catalyst is preferably concentrated to a solution which contains from about 30 to 80 percent volatiles, and better results have been obtained when there is from about 50 to 70 percent volatiles by weight. The carrier may be added to the catalyst solution or the catalyst solution may be poured onto the carrier. Less desirably, the Alundum or other carrier may be present during the whole course of reactions to provide the desired vanadium - oxygen - phosphorus - third metal component complex. After the catalyst complex has been coated onto the carrier, the vanadium may be converted to a more active form by heating in the presence of an oxidizing gas.

The support or carrier for the vanadium-oxygen phosphorus-third metal component complex, if any, should preferably be inert to both the depositing solution containing the complex and should be inert under the catalytic oxidation conditions. The support provides not only the required surface for the catalyst, but gives physical strength and stability to the catalyst material. The carrier or support normally has a low surface area, as usually measured, from about .001 to about 5 square meters per gram. A desirable form of carrier is one which has a dense non-absorbing center and a rough enough surface to aid in retaining the catalyst adhered thereto during handling and under reaction conditions. The carrier may vary in size but preferably is from about 2½ mesh to about 10 mesh in the Tyler Standard screen size. Alundum particles as large as ¼ inch are satisfactory. Carriers much smaller than 10 to 12 mesh normally cause an undesirable pressure drop in the reactor. Very useful carriers are Alundum and silicon carbide or Carborundum. Any of the Alundums or other inert alumina carriers of low surface may be used. Likewise, a variety of silicon carbides may be employed. Silica gel may be used. The amount of the catalyst complex on the carrier is usually in the range of from about 10 to about 30 weight percent of the total weight of complex plus carrier and more preferably from about 14 to about 24 weight percent on an inert carrier such as Alundum. The amount of the catalyst complex deposited on the carrier should be enough to substantially coat the surface of the carrier and this normally is obtained with the ranges set forth above. With more absorbent carriers, larger amounts of material will be required to obtain essentially complete coverage of the carrier. In the case of silicon carbide, about 25 percent of catalyst is normally used. Excess catalyst over that required to coat the carrier surface is not necessary and usually will be lost by mechanical attrition. The final particle size of the catalyst particles which are coated on a carrier will also preferably be about 2½ to about 10 mesh size. The carriers may be of a variety of shapes, the preferred shape of the carriers being in the shape of cylinders or spheres. Although more economical use of the catalyst on a carrier in fixed beds is obtained, the catalyst may be employed in fluid bed systems. Of course, the particle size of the catalyst used in fluidized beds is quite small, varying from about 10 to about 150 microns and in such systems the catalyst normally will not be provided with a carrier but will be formed into the desired particle size after drying from solution.

The reaction involves contacting the aldehydes in vapor phase in low concentration with the described catalyst, oxygen and preferably steam. Once the reaction is begun, it is self sustaining because of the exothermic nature of the reaction. A variety of reactors will be found to be useful and multiple tube heat exchanger type reactors are quite satisfactory. The tubes of such reactors may vary in diameter from about ¼ inch to about 3 inches, and the length may be varied from about 3 to about 10 or more feet. As mentioned, the oxidation reaction is an exothermic reaction and, therefore, relatively close control of the reaction temperature should be maintained. It is desirable to have the surface of the reactors at a relatively constant temperature and some medium to conduct heat from the reactors is necessary to aid temperature control. Such media may be Woods metal, molten sulfur, mercury, motlen lead, and the like, but it has been found that eutectic salt baths are completely satisfactory. One such salt bath is a sodium nitrate-sodium nitrite-potassium nitrate eutectic constant temperature mixture. An additional method of temperature control is to use a metal block reactor whereby the metal surrounding the tube acts as a temperature regulating body. As will be recognized by the man skilled in the art, the heat exchange medium will be kept at the proper temperature by heat exchangers and the like. The reactor or reaction tubes may be iron, stainless steel, carbon-steel, nickel, glass tubes, such as Vycor, and the like. Both carbon-steel and nickel tubes have excellent long life under the conditions of the reactions described herein. Normally, the reactors contain a preheat zone of an inert material such as ¼ inch Alundum pellets, inert ceramic balls, nickel balls or chips, and the like, present at about one-half to one-fourth the volume of the active catalyst present.

The gaseous feed to the reactor contains reaction concentrations of unsaturated aldehyde, oxygen and water vapor. By reaction concentrations, it is meant that the reactants (unsaturated aldehyde, oxygen and steam) are present in concentrations which direct the oxidation of the aldehyde to the corresponding acid. Excessive concentrations of oxygen, for example, result in increased decarboxylation of the carbonyl group of the aldehyde feed. Generally, an inert gas is also present, such as nitrogen or helium. The oxygen is usually added in the form of air or as air enriched with oxygen. The aldehyde portion of the gaseous feed mixture is generally present in concentrations of about 0.50 to 3.0 mol percent of the total feed, excluding steam, with a preferred range of about 0.80 to 2.0 mol percent. The oxidation may also be conducted at higher concentrations such as 10 to 20 mol percent or higher of aldehyde based on the total feed excluding steam. Steam will be present from about 5 to 95 mol percent of the total feed. Oxygen may be present from about one-half to 40 mols per mol of aldehyde with a preferred ratio of about 1.5 to 25 mols per mol of aldehyde. When no inert diluent gases are used, the preferred ratio is from 1.5 to 4.0 mols oxygen per mol of aldehyde. When air is used as the source of the oxygen, the preferred ratio of oxygen to aldehyde is from about 10 to 20 mols of oxygen per mol of aldehyde.

The temperature of the reaction at the center of the reactor should be within the range of from about 150 to 800° C. The highest conversions are usually obtained in the range of 200 to 600° C. Because the reaction is exothermic, means for conducting the heat away from the reactor are normally employed. The temperature may be controlled by conventional methods such as the use of brass block reactors, or reactors surrounded by a salt bath. When using salt baths, best results are obtained when the temperature at the center of the reactor is no greater than 50° C. and generally less than 10° C. above the temperature of the salt bath. The temperature of the reaction will be dependent somewhat upon the size of the reactor and upon the concentration of aldehyde in the feed. Normally, the temperature of the salt bath will be from about 200 to 575° C.

The flow rate of the gaseous stream through the reactor may be varied within rather wide limits, but a preferred range of operations is at the rate of about 20 to 200 grams of aldehyde per liter of catalyst per hour and more preferably about 50 to about 100 grams of aldehyde per liter of catalyst per hour. Residence times of the gas stream will normally be less than about 20 seconds, more preferably from about 0.1 to 3.0 seconds. When higher concentrations of aldehyde are fed, the higher contact times may be used.

The pressure on the reactor is not generally critical, and the reaction may be conducted at atmospheric, superatmospheric or below atmospheric pressure. The exit pressure will be at least slightly higher than the ambient pressure to insure a positive flow from the reactor. The pressure of the inert gases must be sufficiently high to overcome the pressure drop through the reactor.

The catalyst and the processes of the present invention are useful for the production of aliphatic acids from lower aliphatic aldehydes generally. Both saturated and unsaturated aldehydes of from 3 to 6 carbon atoms may be used. The preferred starting materials are the monoethylenically unsaturated aliphatic monoaldehydes of from 3 to 6 carbon atoms such as acrolein, crotonaldehyde, methacrolein, 2-methyl-2-butenyl, 2-methyl-2-pentenal, and the like. Best results have been obtained with acrolein and methacrolein. Mixtures of aldehydes with other aldehydes or with hydrocarbons may be used. For example, a mixture of methacrolein and isobutylene may be fed as the starting material. If desired, the reactor effluent may be recycled to the reactor for increased yields.

The unsaturated acid product may be recovered by a number of ways well known to those skilled in the art. For example, the acid may be condensed, or scrubbed with water, or other suitable solvents, followed by separation of the unsaturated acid product.

The unsaturated acid products of this invention have many well known commercial uses, particularly as monomers for polymer formation or in the formation of esters such as methyl methacrylate.

The following examples are intended to be only illustrative rather than limiting the invention.

*Example 1*

43.2 grams of vanadium pentoxide were added to 500 milliliters of 37 percent hydrochloric acid at room temperature. The mixture was refluxed slowly for about 24 hours. A blue solution was obtained, showing that the vanadium had an average valence of less than plus five.

14.7 grams of Co₂O₃ were added, and the solution was refluxed for four hours. The solution was cooled to about 40° C. and 38.9 grams of P₂O₅ were cautiously added to the solution, and the mixture was again refluxed for about 24 hours. The resulting deep blue solution was evaporated to about 250 milliliters and the solution was deposited onto 480 grams of hydrochloric acid extracted 3/16 in. x 3/16 in. cylindrical Alundum pellets. The carrier particles coated with the complex were then dried at low temperatures to remove the volatiles. A free flowing catalytic material was obtained which had the catalyst complex uniformly deposited on the surface of the Alundum particles. The catalyst particles were then heated at 300° C. in air for a period of about one hour with the time of heat up to 300° C. being about four hours. The coated Alundum contained 20 weight percent of the complex based on the weight of the carrier plus complex. The complex which was coated on the carrier had an atomic ratio of 0.40 vanadium, 0.45 phosphorus, and 0.15 cobalt.

A 3 foot long, ¾ inch I.D. nickel reactor tube surrounded by a salt bath was loaded with 300 milliliters of the catalyst. On top of the catalyst was loaded 100 milliliters of 6 mm. x 6 mm. Vycor Raschig rings to form a preheat zone. A gaseous mixture containing by volume 80 percent steam, based on the total feed, 0.32 percent methacrolein based on the total feed, excluding steam, and the remainder air was fed to the reactor at a rate to provide 30 grams of methacrolein per liter of catalyst per hour. At a salt bath temperature of 480° C. and a temperature at the center of the reactor of about 477° C., methacrylic acid was produced at a yield of 41 mol percent based on the weight of methacrolein fed. The methacrylic acid was recovered by bubbling the gaseous stream through water.

When the above catalyst was used to oxidize acrolein to acrylic acid, high yields of the acid were obtained.

*Example 2*

Example 1 was repeated with the exception that the catalyst used in this example contained a catalytic active composition comprising a vanadium-phosphorus complex in an atomic ratio of 0.40 atom of vanadium to 0.55 atom of phosphorus. A third metal component was not incorporated into the catalytic complex.

Under operating conditions which were essentially the same as that reported in Example 1, a methacrylic acid yield of only 9 percent was obtained.

I claim:
1. A process for the oxidation of lower aliphatic aldehydes to the corresponding acids which comprises contacting at a temperature above 150° C. reaction concentrations of a gaseous mixture of said aldehyde and oxygen with a catalytic active composition consisting essentially of a complex of vanadium, phosphorus, oxygen and a third metal component selected from the group consisting of iron, cobalt and nickel, and mixtures thereof, and wherein the relative atomic proportions of said complex are from 0.15 to 0.50 atom of vanadium to about 0.30 to 0.70 atom of phosphorus to about 0.05 to 0.35 atom of said third metal component.
2. The process of claim 1 wherein the lower aliphatic aldehydes are monoethylenically unsaturated monoaldehydes having 3 to 6 carbon atoms.
3. The process of claim 2 wherein the monoethylenically unsaturated aldehyde is selected from the group consisting of acrolein, methacrolein, crotonaldehyde, 2-methyl-2-butenal, or 2-methyl-2-pentenal.
4. The process of claim 3 wherein the temperature is between 150° C. and 800° C.
5. The process of claim 4 wherein said gaseous mixture contains steam in an amount of between 5 and 95 percent based on the total gaseous mixture.
6. The process of claim 5 wherein the aldehyde is present in a concentration of about 0.50 to 3.0 mol percent based on the total gaseous mixture excluding steam and wherein the oxygen is present from about one-half to 40 mols of oxygen per mol of aldehyde.
7. The process of claim 6 wherein the relative atomic proportions of the catalytic complex are from 0.20 to 0.40 atom of vanadium to about 0.40 to 0.65 atom of phosphorus to about 0.01 to 0.30 atom of the third metal component.
8. The process of claim 6 wherein the catalytic complex is deposited on an inert carrier in a concentration of from about 10 to 30 weight percent based on the total weight of the catalytic complex plus carrier.
9. The process of claim 8 wherein the inert carrier is silica.
10. A catalytic active composition useful for the vapor phase oxidation of aliphatic aldehydes to aliphatic acids consisting essentially of a complex of vanadium, phosphorus, oxygen and a third metal component selected from the group consisting of iron, cobalt and nickel, and mixtures thereof, and wherein the relative atomic proportions of said complex are from 0.15 to 0.50 atom of vanadium to about 0.30 to 0.70 atom of phosphorus to about 0.05 to 0.35 atom of said third metal component, and an inert carrier.

References Cited

UNITED STATES PATENTS

| 2,462,938 | 3/1949 | Bludworth et al. | |
| 3,132,109 | 5/1964 | Morrell | 252—449 X |
| 3,087,964 | 4/1963 | Koch et al. | 260—530 |
| 3,065,264 | 11/1962 | Koch et al. | 260—533 |

FOREIGN PATENTS

| 930,034 | 8/1962 | Great Britain. |

OTHER REFERENCES

Bhattacharyya: N. Catalytic Vapor-Phase Oxidation of Crotonaldehyde to Maleic Acid, J. Appl. Chem. vol. 8, pp. 737–743.

Bhattacharyya, S. K., and Gulati, S. B.: Catalytic Vapor-Phase Oxidation of Xylenes, Ind. Eng. Chem. vol. 50, pp. 1719–1726, 1958.

LORRAINE A. WEINBERGER, *Primary Examiner.*

RICHARD K. JACKSON, *Examiner.*

KAREN I. ROSE, VIVIAN GARNER,
*Assistant Examiners.*